US009060060B2

(12) United States Patent
Löbig

(10) Patent No.: US 9,060,060 B2
(45) Date of Patent: Jun. 16, 2015

(54) EFFICIENT UTILIZATION OF IVR RESOURCES SUPPLIED TO SWITCHING SYSTEMS

(75) Inventor: Norbert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 3465 days.

(21) Appl. No.: 10/505,002

(22) PCT Filed: Feb. 5, 2003

(86) PCT No.: PCT/EP03/01132
§ 371 (c)(1),
(2), (4) Date: Aug. 18, 2004

(87) PCT Pub. No.: WO03/071771
PCT Pub. Date: Aug. 28, 2003

(65) Prior Publication Data
US 2005/0163288 A1    Jul. 28, 2005

(30) Foreign Application Priority Data
Feb. 19, 2002   (EP) .................................... 02003741

(51) Int. Cl.
*G10L 21/00*    (2013.01)
*H04M 3/493*    (2006.01)

(52) U.S. Cl.
CPC .......... *H04M 3/493* (2013.01); *H04M 2201/40* (2013.01)

(58) Field of Classification Search
USPC .................. 370/352, 237; 709/228, 200, 220; 379/338, 219, 309, 265.09; 455/408, 455/416
See application file for complete search history.

(56) References Cited

U.S. PATENT DOCUMENTS

| 5,479,487 | A | * | 12/1995 | Hammond | ................. 379/88.22 |
| 5,794,140 | A | * | 8/1998 | Sawyer | ......................... 455/408 |
| 5,825,869 | A | * | 10/1998 | Brooks et al. | ............ 379/265.12 |

(Continued)

FOREIGN PATENT DOCUMENTS

EP    1 156 649 A1    11/2001

OTHER PUBLICATIONS

Voice Response for AIX—Speech Recognition With the BBN Hark Recognizer Version 2, Release 2, 1999, pp. 1-16, XP002150246.

*Primary Examiner* — Michael Colucci
(74) *Attorney, Agent, or Firm* — Laurence A. Greenberg; Werner H. Stemer; Ralph E. Locher

(57) ABSTRACT

The invention relates to an interactive voice response (IVR) system supplying functions and resources to services encompassing interactive voice response or output of announcements and three methods for dealing with resource bottlenecks of the IVR system. The IVR system supplies a pool of resources to several switching systems. Virtual, individually assigned IVR systems are created from the perspective of the switching systems by allocating the control interfaces and user data interfaces of the IVR system in an exclusive, disjunctive manner to the switching systems. Resource bottlenecks can be prevented when several switching systems access the IVR system by rejecting jobs for which the required resources cannot be reserved or by aborting jobs creating too substantial delays during processing due to the wait for resources. The invention has the advantage of efficiently utilizing the resources supplied by the IVR system.

18 Claims, 2 Drawing Sheets

(56) References Cited

U.S. PATENT DOCUMENTS

| | | | |
|---|---|---|---|
| 5,870,464 A * | 2/1999 | Brewster et al. | 379/219 |
| 5,884,032 A * | 3/1999 | Bateman et al. | 709/204 |
| 5,963,635 A * | 10/1999 | Szlam et al. | 379/309 |
| 5,983,096 A * | 11/1999 | Lietha et al. | 455/416 |
| 6,118,866 A * | 9/2000 | Shtivelman | 379/309 |
| 6,311,231 B1 * | 10/2001 | Bateman et al. | 379/265.09 |
| 6,459,788 B1 * | 10/2002 | Khuc et al. | 379/265.09 |
| 6,570,855 B1 * | 5/2003 | Kung et al. | 370/237 |
| 6,587,556 B1 * | 7/2003 | Judkins et al. | 379/219 |
| 6,731,744 B1 * | 5/2004 | Khuc et al. | 379/265.01 |
| 6,788,781 B2 * | 9/2004 | Shtivelman | 379/309 |
| 6,788,783 B1 * | 9/2004 | Deichstetter | 379/338 |
| 6,854,009 B1 * | 2/2005 | Hughes | 709/220 |
| 6,901,403 B1 * | 5/2005 | Bata et al. | 1/1 |
| 7,475,149 B2 * | 1/2009 | Jacob et al. | 709/228 |
| 2002/0176404 A1 * | 11/2002 | Girard | 370/352 |
| 2003/0135627 A1 * | 7/2003 | Hussain | 709/228 |
| 2004/0006476 A1 * | 1/2004 | Chiu | 704/270.1 |
| 2004/0117218 A1 * | 6/2004 | Friedrich et al. | 705/5 |
| 2005/0050138 A1 * | 3/2005 | Creamer et al. | 709/200 |

\* cited by examiner

EFFICIENT UTILIZATION OF IVR RESOURCES SUPPLIED TO SWITCHING SYSTEMS

CROSS REFERENCE TO RELATED APPLICATIONS

This application is the US National Stage of International Application No. PCT/EP03/01132, filed Feb. 5, 2003 and claims the benefit thereof. The International Application claims the benefits of European application No. 02003741.2 filed Feb. 19, 2002, both of the applications are incorporated by reference herein in their entirety.

FIELD OF INVENTION

The invention relates to an IVR system (interactive voice response system) for supplying functions and resources for services encompassing interactive voice response or output of announcements, and three methods for dealing with resource bottlenecks in the IVR system.

BACKGROUND OF INVENTION

Many telecommunication services incorporate the output of announcements and dialogs. Such types of services presuppose that the switching technology provides the functionality required for this purpose.

The switching performance features of the services which require the output of announcements and dialogs are in many cases SCP (Service Control Point) based performance features of the "intelligent network" (concept of decentralized control of services, defined in the Q.1200 series of the ITU (International Telecommunications Union)). For services associated with the intelligent network concept which provide for the output of announcements and the execution of dialogs, the provision of corresponding basic functions to which the SCP has access with the aid of the Intelligent Network Application Protocol (INAP) by a switching system is required.

However, situations detected in a switching system can also result in the direct, in other words not controlled by an SCP, output of a standard announcement (for example: "This number has not been recognized") or an announcement including variable elements (for example: "The number you have dialed has changed, please redial using 12345"). There are moreover also dialogs whose logic or execution sequence is implemented in the switching system without SCP support. These are to be found first and foremost in the area of switching control or selection of characteristics or features for the service by the end user or in the case of services which incorporate through-connection to call centers or telephone switchboards.

The automated output of voice information, for example in the form of announcements, and the automated recognition and handling of voice information, for example for speech dialogs, requires that the telecommunication service provider or carrier makes available a corresponding functionality or corresponding resources—referred to in the following as IVR (interactive voice response) resources. IVR resources required in respect of telecommunication services comprise for example hardware elements such as computing power and storage space and also software elements such as program structures for automatic speech recognition (ASR) and for the text to speech (TTS) conversion. With regard to services having automated voice output, as a rule a user data connection is made between the subscriber and the IVR resources. It is the task of the switching facilities to establish this connection as and when required in the course of service control. The corresponding switching functions are provided by switching systems. Different solutions are available for the provision of the required resources, depending on the user data routing:

With regard to TDM (time division multiplexing) based networks, as a rule the user data stream is routed by way of the controlling switching system or the switching node. In many cases of TDM networks, therefore, the IVR resources are made available in or near a switching node. The provision of the basic functions associated with the announcement dialogs (output of recorded speech, recognition of DTMF (dual tone multiple frequency) inputs, TTS and ASR) is effected for example by means of special facilities integrated in the switching system or by means of peripheral device elements external to the switching system—often referred to as intelligent peripherals—which are situated upstream of the switching system.

With regard to packet based networks, as a rule it is only control messages for establishing and controlling the user data connection which are routed by way of the switching system, rather than the user data stream. In packet based networks, IVR resources are therefore frequently made available using a resource server (referred to as IVR server in the following) which is assigned to the switching system controlling the connection.

The development of ever more sophisticated services, with subscriber-specific features in some cases, results in greater demands on the IVR resources and/or on the IVR system. The IVR system in this situation is understood to be the device which includes the IVR resources. This can for example be one or more intelligent peripherals or an IVR server which are optionally supported by further content servers. Speech processing in particular, for example the conversion of text into speech and speech recognition, has a considerable resource requirement in respect of computing power and storage space. In addition, as the complexity of the services increases, so too does the complexity of the software required, and this has associated increased costs. The greatest possible level of efficiency of utilization of the IVR resources is therefore desirable.

SUMMARY OF INVENTION

The object of the invention is to improve the efficiency of utilization of resources supplied by IVR systems.

This object is achieved by the claims.

More than one switching system has access to the IVR system according to the invention. The IVR system comprises resources and functions which are capable of being used for more than one switching system. Each of the accessing switching systems has exclusive access to at least one control interface of the IVR system. The IVR system has user data interfaces for the user data (user data are sometimes characterized as pay load) which is to be switched by the switching system and is provided with means for recognizing and handling or controlling resource bottlenecks. Through the administration of the IVR system, it is possible to ensure that each switching system issues control commands for the user data channels it has routed in only by way of the control interface or control interfaces assigned to it. As a result, it is possible for example to exclude a situation whereby one switching system generates a control command to an IVR system according to the invention which relates to a port on the IVR system that is connected to a different switching system. From the viewpoint of the switching systems, this results in the situation of an IVR system assigned exclusively to the switching system. In the same way as control interfaces, user data interfaces can also be assigned exclusively to accessing switching systems. The user data interfaces can be designed for TDM based user data or for packet based user data. In both cases, in order to route the user data stream of a connection of one of the switching systems (VST1, VST2) the user data interface can comprise at least one port, addressable by way of the control interface, it being possible to define said port in the case of packet based user data through address assignment of packet addresses. Since a plurality of switching systems can access the IVR system according to the invention and use resources, the utilization of the resources supplied by the system is better. As a rule, optimum utilization will be achieved when all accessing switching systems have access to all the resources supplied by the IVR system. As a result of the exclusive assignment of control interfaces, the access by switching systems can take place fully transparently with respect to other accessing switching systems. For the accessing switching system, to all practical purposes the IVR system then represents a virtual IVR system with exclusive access.

Particularly when the resources call for relatively high capacities, for example in the case of services having dialogs modified on a subscriber-specific basis, a decentralized or distributed organization of the resources can result in a better load distribution and facilitated administration. The resources can for example be distributed over a plurality of intelligent peripherals or servers. Within the framework of resource allocation, applications started by switching systems in the IVR system can for example access a content server which incorporates formation rules and/or software for speech handling, for example. There can be two servers in this case, for example, an IVR server and a content server, whereby the IVR server has interfaces with the switching systems and is responsible for the resource management, and formation specifications are available on the content server for handling (possibly subscriber-specific) dialogs. Transferring the resources onto a content server can for example serve to simplify the administration. Licenses for the servers can be organized as network licenses for a plurality of IVR servers or content servers, whereby the licenses are dynamically reserved and released again. In this situation, it is possible for a content server to simultaneously include the functions of the licensing server.

For the situation where resource bottlenecks occur in the IVR system during access by switching systems, one of the methods according to the invention can be applied.

With regard to the first method according to the invention, an application initiated by a switching system is halted in the IVR system if the required resources are not available during processing of the application. The application then waits for the required resources to become available. If the waiting time exceeds a limit value without it being possible to make the required resources available, the application is aborted and an error message is sent to the associated switching system. The first method according to the invention has the advantage of efficient utilization of the IVR system according to the invention. Only when the waiting times become too long as a result of resource bottlenecks are applications aborted.

With regard to the second method according to the invention, extended waiting times are avoided through a reservation of resources. With regard to this method, the execution of an application in the case of the IVR system is requested by a switching system. The resources required for execution of the application are determined and their availability is checked. If the required resources are available, they are reserved and the application is started. If the result of the check is negative, execution of the application can be rejected directly or the application waits for the required resources for a limited period of time. The application is then started if the required resources become free during the waiting time and is rejected if the required resources do not become available during the period of time. The second method has the advantage that delays in the execution of the application are avoided through the reservation of resources. It is thus possible to make precise specifications in respect of the duration of processing of the application. In the case of access to a plurality of IVR systems by one switching system, for example when the IVR system is doubled up to offer redundancy protection, a different IVR system can be used with no significant loss of time for an application for which it has not been possible to reserve adequate resources in one of the IVR systems.

In an IVR system according to the invention, one of the two methods according to the invention can in general be used for all applications. Alternatively, the one or the other method can be used according to the application-specific parameters for an application for example. The selection of the method can carried out in a manner specific to requirements (maximum permissible delay, resource requirement . . . ). It is also conceivable for the selection of the method to be carried out according to different parameters or to further non-application-specific parameters. It is thus possible for example to prevent too many applications from executing in parallel and thereby to prevent inefficient processing of the applications as of a particular loading level by only accepting further applications for which the required resources can be reserved in advance. In other words, as of a particular loading level on the IVR system only the second method is then used. In general, the parameter-dependent selection of the method for handling resource bottlenecks and/or further system responses to the aborted termination of an application such as the resource-specific recording of abnormal termination reasons (for statistical evaluation, for example) and the notification of the switching system can be configurable in the IVR system. For example, it is also possible to specify a threshold for abnormal terminations which, when exceeded, sends an alarm to the switching system and initiates countermeasures.

Other advantageous developments are set down in the remaining subclaims.

The IVR system according to the invention and the methods according to the invention will be described in the following as an embodiment with reference to the drawings.

In the drawings:

DETAILED DESCRIPTION OF INVENTION

Figure 1:
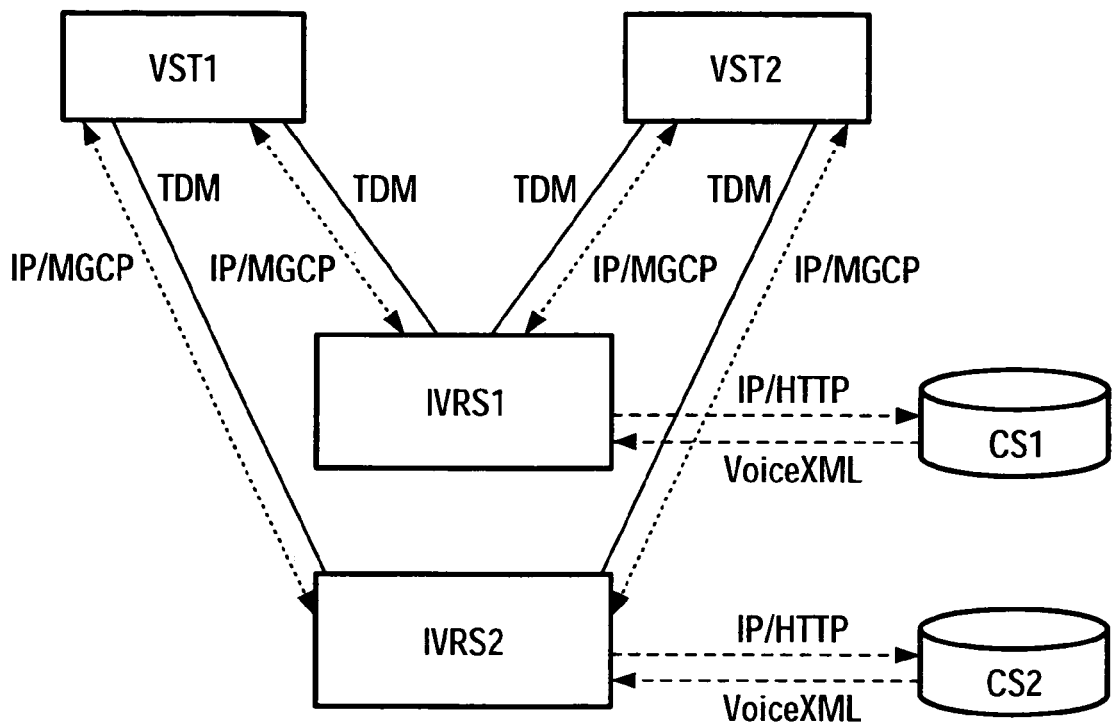
FIG. 1: shows an IVR system according to the invention with doubling up of the components.

FIG. 1 shows two switching systems VST1 and VST2, two IVR servers IVRS1 and IVRS2 and also two content servers CS1 and CS2. The doubling up of the IVR servers IVRS1 and IVRS2 and of the content servers CS1 and CS2 is on the one hand a security measure. If one server fails, its functions can be taken over by the other functionally identical server. On the other hand, as a transitional measure, jobs which can no longer be processed by an IVR system on account of a lack of resources can be forwarded to the other IVR system. The two switching systems VST1 and VST2 each have access to both IVR systems. Control messages are exchanged between the switching systems VST1 and VST2 and the IVR systems by way of an IP (internet protocol) network with the aid of the Media Gateway Control Protocol (MGCP) (identified in the figure by the reference character IP/MGCP and a dotted line). A different possible protocol is the H.248 protocol. The exchange of information or data between the IVR servers IVRS1 and IVRS2 and the content servers CS1 and CS2 is carried out by way of an IP network with the aid of the HTTP (hypertext transfer protocol) (identified in the figure by the reference character IP/HTTP and broken lines). Each of the switching systems VST1 and VST2 routes a fixed number of TDM based 64 kbit/sec channels—also referred to as DS0 channels—to the IVR servers IVRS1 and IVRS2 (identified in the figure by the reference character TDM and solid lines). The channels are used for transporting user data (announcements and operator inputs) and terminate in the case of TDM channels on the switching system side and also on the IVR system side at corresponding PCM30 (PCM: pulse code modulation) interfaces. Alternatively, the user data connections can also relate to a plurality of RTP (real time protocol) connections which are routed in by way of an IP network. When implementing user data transmission by way of a packet-oriented network, in contrast to the case shown in FIG. 1 of transmission by way of a TDM network the user data stream would not as a rule be routed by way of the switching centers VST1 and VST2. Over the MGCP interface, each switching system addresses only those ports of the IVR servers IVRS1 and IVRS2 to which it routes connection lines. These connection lines are permanently switched through. For each of the switching systems VST1 and VST2, in each case ports of the IVR servers IVRS1 and IVRS2 which are connected to further switching systems are not set up and are thus not addressable. The sum of the channels routed to the IVR servers IVRS1 and IVRS2 is generally greater than the number or capacity of the different resources of the IVR servers IVRS1 and IVRS2 available in the IVR servers IVRS1 and IVRS2. Resources are as a rule are only utilized simultaneously by a part of the channels routed in. In this manner, savings can be made on resources compared with a solution which exclusively assigns a separate IVR server to each switching system, without access to resources by the switching systems being adversely affected to a significant degree. Examples of the various resource types that can occur and be restricted include CPU features, memory facilities, TTS licenses, ASR licenses, conferencing functions etc.

Each IVR system has certain hardware and software resources, namely a certain number of processor cards and interface cards which can provide a maximum performance for processing and speech synthesis, speech recognition, DTMF recognition, echo compensation etc. in a certain mixture. In addition, the capabilities for parallel execution of speech recognition, speech synthesis, language recognition are limited by the number of licenses obtained for the IVR system. The switching systems VST1 and VST2 output jobs to the IVR systems by way of the control interface. These jobs reference the announcements to be output or the dialogs to be conducted and contain certain control parameters such as, for example, a telephone number to be announced, the language in which the output is to be made, or the time interval within which the inputs are expected to be made. The resource requirement for a job is not known in each case in switching systems VST1 and VST2. The addressed IVR system obtains from the job the elementary steps which are actually to be executed in order to provide announcements or dialogs. To this end, a logic facility is required which is transferred to a content server CS1 or CS2. From the job parameters, this logic produces the complete specification for the generation of announcements or dialogs. In the embodiment this is a VoiceXML page or VoiceXML formation rules which reference all the recording fragments that are to be output or text files that are to be read out. The VoiceXML formation rules are conveyed to the IVR server IVRS1 or IVRS2 (identified in FIG. 1 by the reference character VoiceXML) and are then processed by the IVR system.

One of the methods according to the invention is used following generation of the specification for the provision of announcements or dialogs. With regard to a course of action in accordance with the first method according to the invention, the IVR system begins to process the specification. This means for example that an announcement is played on the port desired by the switching system VST1 or VST2, echo compensation is activated for this purpose and a speech recognition facility is activated for certain keywords. Should a resource bottleneck occur during processing of the specification, for example no speech recognition facility is available at the time it is required because the maximum number of licenses has already been exhausted for other jobs, then if necessary after a small waiting time to verify the ongoing non-availability of the required resources the job will be aborted with a corresponding abnormal termination message or error message to the switching system. The verification of the non-availability of the required resource is carried out by means of time-monitored waiting for availability (wait on semaphore) or repeated checking of the availability (polling). The fact of, and the reason for, the abnormal termination are stored in the IVR system for statistical evaluation and for the information of the network operator. When the abnormal termination of the job is signaled to the switching system, the associated connection is released by the switching system VST1 or VST2.

With regard to a course of action in accordance with the second method according to the invention, all the required resources are reserved prior to job processing in the IVR system. Should a resource not be permanently available, if necessary after a short waiting time in order to verify the permanent non-availability of the required resource the job is rejected with a corresponding message to the switching system VST1 or VST2. The fact that the job has been rejected owing to lack of a resource is stored together with details relating to the missing resource in the IVR system for statistical evaluation and for the information of the network operator. Since the job had not yet been commenced, the switching system can perform a rerouting to a different port on a further IVR system and send the same job to this further IVR system, whereby the success rate for the request is further increased. In the case of the duplicated IVR system represented in FIG. 2, this can be the other system in each case. If all the resources required for the job can be reserved a priori, then the job will be processed by the IVR system. During processing of the job, resources which are no longer required are released step by step.

In addition to the option whereby one of the two represented methods according to the invention, administered in the IVR system for example, is used generally for all jobs or applications, it is also possible to combine the two methods. The selection of the procedure or method is then made on a job-specific basis, for example linked to the job number or to application-specific parameters. Alternatively, the selection can be made in accordance with status parameters for the IVR system, possibly in conjunction with job-specific parameters.

Figure 2:
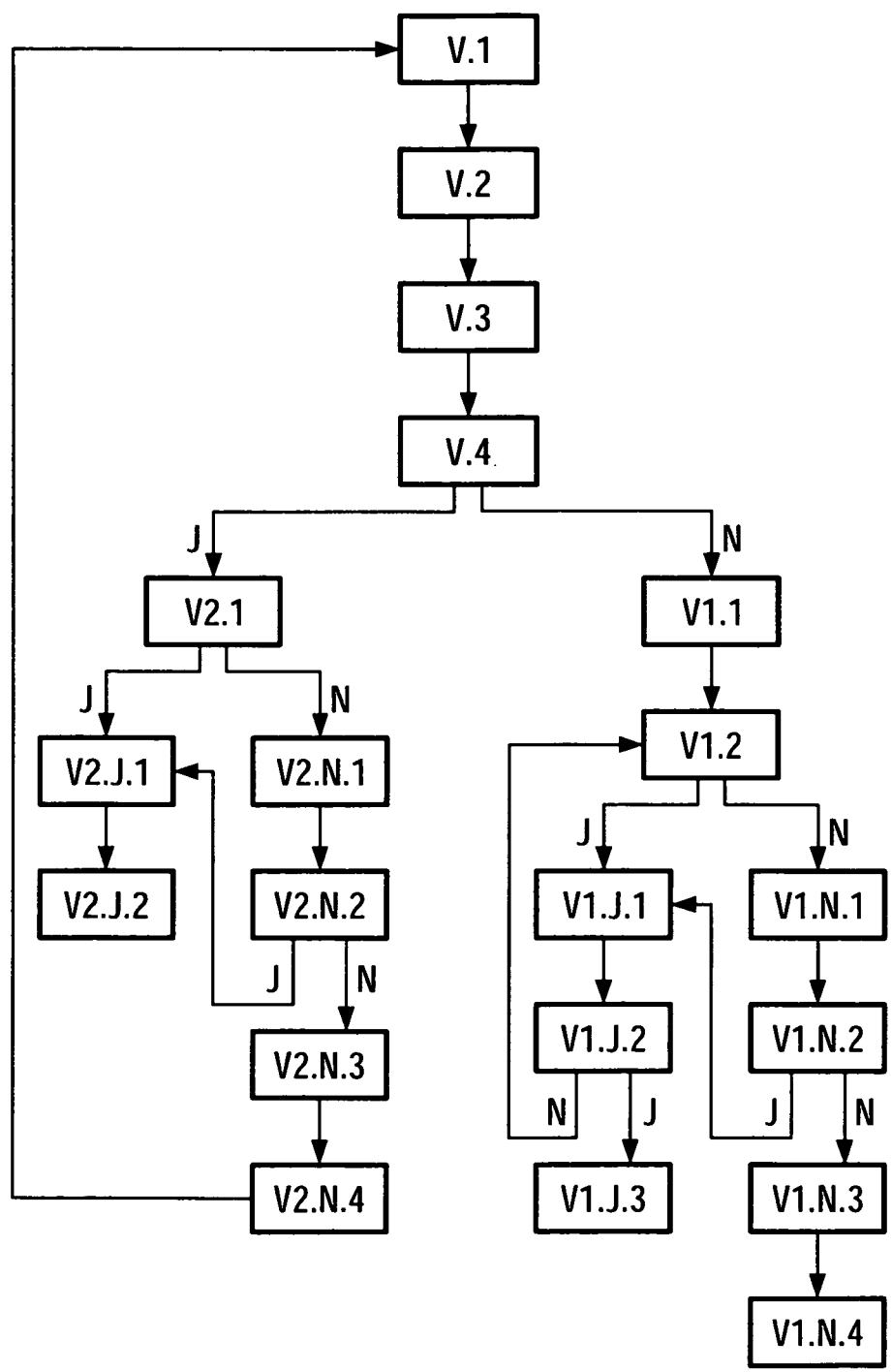
FIG. 2: shows a flowchart for a method according to the invention.

FIG. 2 shows a flowchart for a combined application involving both methods. The flowchart comprises the following steps:

V.1: An IVR port is selected by the switching system and a job is issued to the corresponding IVR system. The MGCP protocol is used for the job.

V.2: In a second step, in the IVR system the job parameters are then forwarded to the logic server or content server. This is done using the HTTP protocol.

V.3: The logic server or content server produces a processing specification in VoiceXML which is conveyed to the IVR system.

V.4: With the aid of the processing specification obtained from the logic server, the IVR system determines the resources required. A decision is made depending on the job as to whether a pre-reservation of all required resources is needed. If no pre-reservation of all required resources is needed (identified in the flowchart by an N), the first step V1.1 of the first method according to the invention is executed. Otherwise (identified by a J), the first step V2.1 of the second method according to the invention is executed.

V1.1: The job is started. The necessary resources are reserved on a step by step basis.

V1.2: A check is made by the IVR system to determine whether the required resources are available if needed. If the required resources are available if needed (J), execution continues with step V1.J.1. Otherwise (N), step V1.N.1 follows.

V1.J.1: Processing of the job is continued. The necessary resources are released on a step by step basis.

V1.N.1: If the required resources are not available, a time-limited wait for the required resources is initiated.

V1.N.2: The IVR system measures the waiting time. If a limit value for the waiting time is exceeded whilst waiting for the required resources without it being possible to make them available (N), step V1.N.3 follows. Otherwise (J), execution continues with step V1.J.1.

V1.N.3: The job is aborted and the switching system is notified.

V1.N.4: The switching system clears down the connection to the IVR system.

V1.J.2: If the IVR system successfully terminates the job (J), step V1.J.3 follows. Otherwise (N), the method is continued with step V1.2, in other words with the processing of the job and the checking of the availability of the required resources on an as-needed basis.

V1.J.3: On successful completion of the job a corresponding message is sent to the switching system.

V2.1: With regard to the second procedure or method, an attempt is made to reserve all the required resources prior to the processing of the job. If the required resources are available and they have been successfully reserved (J), the method is continued with step V2.J.1. Otherwise (N), step V2.N.1 follows.

V2.J.1: If all the required resources are available, the job is processed following reservation of the resources.

V2.J.2: On completion of the job a message containing the result of the job is sent to the switching system.

V2.N.1: If all the required resources are not available, a time-limited wait for the resources is initiated.

V2.N.2: A check is made as to whether the resources become available. If the resources become available before a limit value is reached for the waiting time (J), the method is continued with step V2.J.1, in other words the reservation of the resources and the start of the job. Otherwise (N), step V2.N.3 follows.

V2.N.3: The job is rejected and the switching system is notified.

V2.N.4: The switching system can then effect a rerouting to another IVR system, for example the second or alternate IVR system shown in FIG. 1.

Abnormal termination of the job or rejection on account of lack of resources is recorded on a resource-specific basis in the IVR system and can be retrieved by the operator. If an excessively high rate of abnormal terminations or rejections is determined per unit of time, then an unsolicited operator message or an alarm can be generated. In this situation, it is possible to configure the threshold values for the operator information and also the associated time intervals as well as the type of the system response directed towards the operator.

The invention claimed is:

1. An IVR (interactive voice response) system for providing resources for services comprising interactive voice response or output of announcements, the IVR system comprising:
   at least one IVR (Interactive Voice Response) server, said IVR server having a plurality of control interfaces, said IVR server having at least one user data interface for user data switched by switching systems;
   a mechanism for recognizing resource bottlenecks; and
   a mechanism for handling resource bottlenecks, wherein
   a plurality of switching systems have access to said IVR server;
   wherein each one of said plurality of switching systems has exclusive access to at least one of said plurality of control interfaces; and
   wherein the resources of the interactive voice response (IVR) system are capable of being used by more than one of said plurality of switching systems having access.

2. The system according to claim 1, wherein each one of said plurality of switching systems has exclusive access to at least one user data interface of the interactive voice response (IVR) system.

3. The system according to claim 1, wherein
   time division multiplexing (TDM) based user data are transferred at least via one user data interface, and wherein
   the user data interface comprises at least one port which is addressable by the control interface for routing the user data stream of a connection of one of the switching systems.

4. The system according to claim 1, wherein
   packet based user data are transferred at least via said user data interface, and wherein
   the user data interface comprises at least one port which is addressable by one of said plurality of control interfaces for routing the user data stream of a connection of one of said plurality of switching systems.

5. The system according to claim 1, wherein
   packet oriented control data are transferred at least via one of said plurality of control interfaces, and wherein
   the MGCP (Media Gateway Control Protocol) protocol or the H.248 protocol is defined for transferring control data to said plurality of control interfaces.

6. The system according to claim 1, wherein the resources comprise at least one of the following resources: computing power, storage space, TTS licenses and ASR licenses.

7. The system according to claim 1, wherein said server provides computer power and storage space.

8. The system according to claim 1, further comprising one or more peripheral device elements (intelligent peripherals) external to the switching system.

9. The system according to claim 1, further comprising a content server having formation rules and/or software for speech handling.

10. The system according to claim 9, wherein the content server comprises the functions of a licensing server.

11. The system according to claim 1, wherein the system is configured with regard to a system response to overloading and/or overbooking.

12. The system according to claim 1, further comprising redundant device elements.

13. A method for handling resource bottlenecks in an interactive voice response (IVR) system, comprising:

- starting an application in the interactive voice response (IVR) system by a switching system, wherein the application requires resources;
- halting the application in the interactive voice response IVR system if resources required to run the application in the interactive voice response IVR system are not available;
- terminating the application in the interactive voice response IVR system if whilst waiting for resources the application is halted for a period of time which exceeds a limit value; and
- sending an error message to the switching system in the event of terminating the application in the interactive voice response IVR system.

14. The method according to claim 13, further comprising: accessing to a content server having formation rules and/or software for speech handling by the interactive voice response (IVR) system.

15. The method according to claim 13, further comprising: in the event of terminating the application recording a lack of resources underlying the terminating.

16. The method according to claim 13, further comprising: requesting the execution of an application in the interactive voice response (IVR) system by a switching system.

17. The method according to claim 13, wherein the method will be performed according to a defined parameter.

18. The method according to claim 17, wherein the defined parameter is specific to the application or the parameter relates to the workload of the interactive voice response (IVR) system.

* * * * *